(No Model.) 2 Sheets—Sheet 1.

E. J. ROWE, R. HOLMES & J. DAWSON.
CHURN.

No. 271,130. Patented Jan. 23, 1883.

Witnesses.
A. Ruppert.
D. P. Rowe

Inventor.
E. J. Rowe
R. Holmes
J. Dawson

Holloway & Blanchard
Attys (No Model.) 2 Sheets—Sheet 2.
E. J. ROWE, R. HOLMES & J. DAWSON.
CHURN.

No. 271,130. Patented Jan. 23, 1883.

UNITED STATES PATENT OFFICE.

ENOCH J. ROWE, ROBERT HOLMES, AND JAMES DAWSON, OF EUREKA, CAL.

CHURN.

SPECIFICATION forming part of Letters Patent No. 271,130, dated January 23, 1883.

Application filed August 7, 1882. (No model.)

*To all whom it may concern:*

Be it known that we, ENOCH J. ROWE, ROBERT HOLMES, and JAMES DAWSON, citizens of the United States of America, residing at Eureka, in the county of Humboldt and State of California, have invented certain new and useful Improvements in Churns, of which the following is a specification, reference being had therein to the accompanying drawings.

Our invention relates to improvements in rotary churns; and it consists in certain novel combination of devices, which will be hereinafter fully described and pointed out in the claim. We attain these objects by the devices and combinations illustrated in the accompanying drawings, in which—

Figure 2:
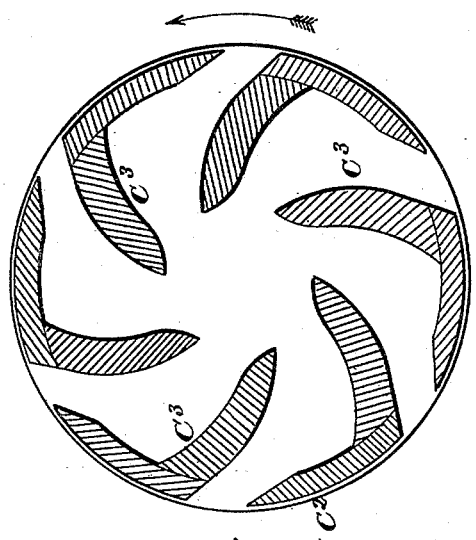
Figure 3:
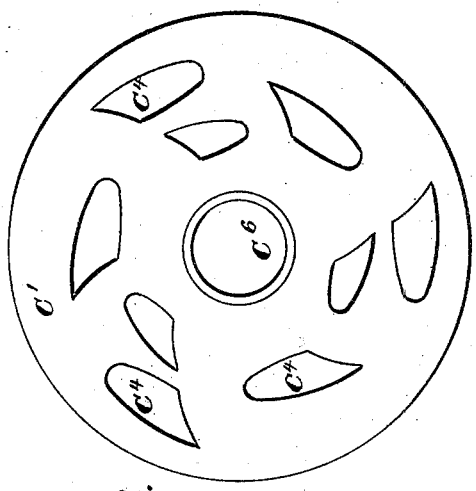
Figure 1:
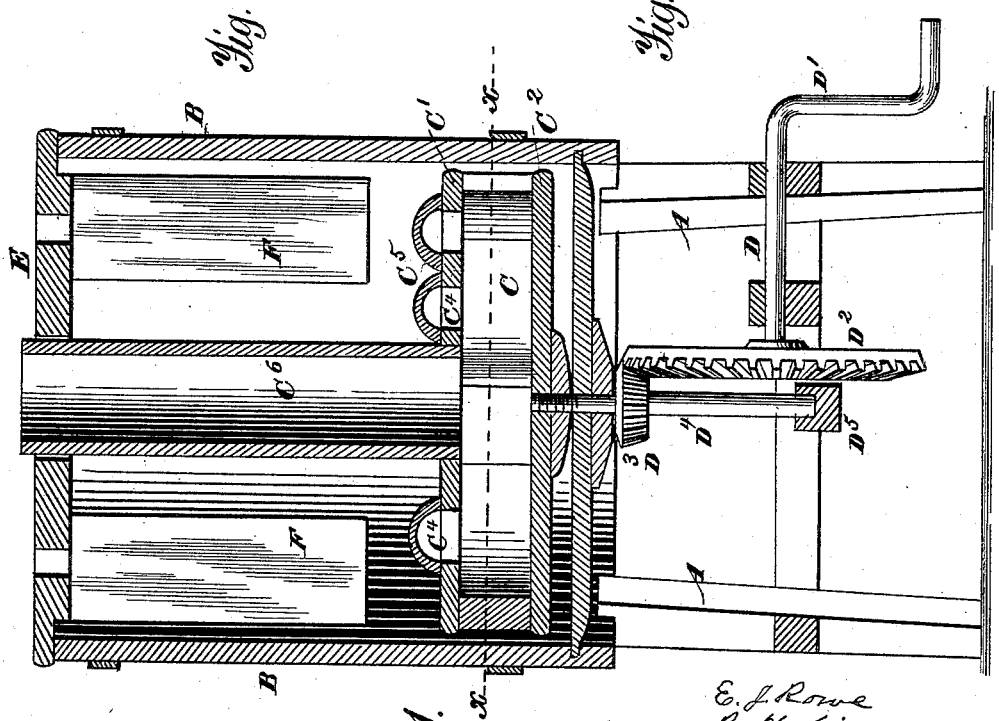
Figure 4:
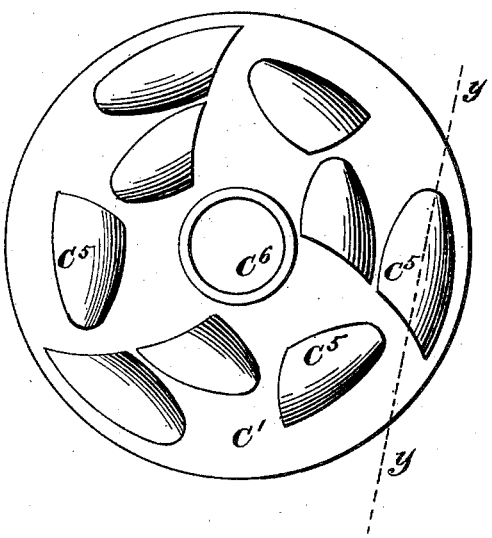
Figure 5:
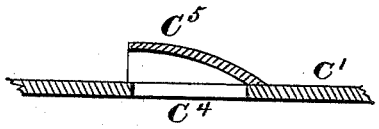

Figure 1 is an elevation, partly in section, showing the frame, the driving-gear, the revolving dashers or agitators, the air-induction tube, and the stationary agitators. Fig. 2 is a transverse section on line $x$ $x$ of Fig. 1, showing the form of the agitators upon the interior of the revolving dasher. Fig. 3 is an inside view of the top plate of the dasher, showing the apertures through which the air-jets pass to the milk or cream above said dasher. Fig. 4 is a plan view of the outer surface of the top plate of the dasher, showing the hoods thereon; and Fig. 5 is a sectional elevation on line $y$ $y$ of Fig. 4.

Similar letters refer to similar parts throughout the several views.

It has been customary heretofore to introduce jets of air into milk and cream while being churned; but, so far as we know, the devices and combinations for that purpose presented by us are novel.

In constructing our improved churn we provide any suitable frame, A, upon which there is mounted a vessel, B, which by preference is made cylindrical, but which may be of any other suitable form, it being firmly secured to the frame A. Within said cylinder there is placed a revolving dasher or agitators, C, of peculiar construction, it consisting of an upper plate, C', a lower plate, C², and a series of agitators, C³, the latter being substantially of the form shown in Fig. 2, and resting upon or firmly attached to the inner surface of plate C², from which they rise, say, two or more inches, the upper surface being covered with the plate C', which is attached thereto by screws or in any other manner. The last-named plate has formed in it a series of apertures, C⁴, as shown in Fig. 3, they being partially covered by hoods C⁵, as shown in Figs. 4 and 5, their construction being such that as the dasher is revolved in the direction indicated by the arrows shown in Fig. 2 air will enter the tube C⁶, attached to or formed upon the top plate of the dasher, its length being sufficient to allow its upper end to pass up through the cover of the vessel B, and pass out in jets through the openings C⁴ into the body of the milk, which is above the dasher, and thus aerate the same while it is being treated.

For the purpose of giving the required movement to the dasher C, there is placed in boxes formed upon the frame A a shaft, D, to the outer end of which there is supplied a crank, D', while upon its opposite end is secured a beveled-gear wheel, D², so placed as to cause it to mesh with a small wheel, D³, secured upon a vertical shaft, D⁴, the lower end of which rests in a step, D⁵, attached to the frame A, its upper end passing up through the bottom head of the vessel B, and carrying thereon the revolving dasher. In practice we prefer to so proportion the wheels D² and D³ that by gearing the shaft D⁴, say, one hundred or less turns per minute, the dasher will revolve from three to four hundred times, this rate of speed having been found to be sufficient to cause the centrifugal action of the revolving dasher to so far relieve the pressure therein as to cause a steady inflow of air through the tube C⁶. In order that the body of the milk or cream above the dasher may be brought into contact with surfaces which will cause the globules thereof to be broken, we place on the cover E of the vessel B pendent blades F F, of which there may be any desired number, their office being to form abutments for the milk or cream to come in contact with while it is in motion, such motion being caused by the action of the revolving dasher.

Having thus described our invention, what we claim, and desire to secure by Letters Patent, is—

A revolving dasher for churns consisting of the plates C' and C², formed as described, the air-tube C⁶, with open outer end above the top of the churn and open inner end even with the lower face of the plate C', the plate C', formed with air-passages C⁴, partially covered by hoods C⁵, substantially as and for the purpose set forth.

In testimony whereof we affix our signatures in presence of two witnesses.

ENOCH J. ROWE.
ROBERT HOLMES.
JAMES DAWSON.

Witnesses:
A. W. RANDALL,
J. S. MURRAY, Jr.